(12) United States Patent
Meloche

(10) Patent No.: US 8,576,717 B2
(45) Date of Patent: Nov. 5, 2013

(54) SYSTEM AND METHOD FOR DETECTING ROGUE TRAFFIC USING FLOW STATISTICS WITH A LIST OF AUTHORIZED ENGINES

(75) Inventor: Jean Meloche, Madison, NJ (US)

(73) Assignee: Avaya Inc., Basking Ridge, NJ (US)

(*) Notice: Subject to any disclaimer, the term of this patent is extended or adjusted under 35 U.S.C. 154(b) by 93 days.

(21) Appl. No.: 13/368,799

(22) Filed: Feb. 8, 2012

(65) Prior Publication Data

US 2013/0201865 A1   Aug. 8, 2013

(51) Int. Cl.
*H04L 1/10* (2006.01)
*H04L 12/28* (2006.01)
*G06F 15/173* (2006.01)

(52) U.S. Cl.
USPC .......................... 370/235; 370/412; 709/224

(58) Field of Classification Search
None
See application file for complete search history.

(56) References Cited

U.S. PATENT DOCUMENTS

| | | | |
|---|---|---|---|
| 8,068,487 B1* | 11/2011 | Ke et al. | 370/389 |
| 2004/0037281 A1* | 2/2004 | Kim | 370/390 |
| 2006/0120283 A1* | 6/2006 | Poetker et al. | 370/230 |
| 2007/0036168 A1* | 2/2007 | Hsiao et al. | 370/412 |
| 2007/0110067 A1* | 5/2007 | Shin et al. | 370/392 |
| 2009/0235278 A1* | 9/2009 | Prakash | 719/314 |

OTHER PUBLICATIONS

"Voice Trafftuc Analysis Using NetFlow ANalyzer", Posted by Praveen Kumar V, Feb. 10, 2001, Retrieved from http://blogs.manageengine.com/netflowanalyzer/2011/02/10/voice-traffic-analysis-using-newflow-analyzer.

* cited by examiner

*Primary Examiner* — Clemence Han

(57) ABSTRACT

Disclosed herein are systems, methods, and non-transitory computer-readable storage media for determining rogue traffic using flow statistics and a list of authorized media engines. A system configured according to this disclosure receives data associated with a group of packets in a media queue, such as the source network address where the packets originated, the destination network address for the packets, and an indication of an associated queue for the packets. The system then verifies the data received by comparing the source network address to a list of network addresses of known media engines. The system further verifies that the indication of an associated queue for the packets is correct for the packets. Should the system detect failure in the verification of known media engines or the verification of indication of associated queues, the system generates a notification.

20 Claims, 5 Drawing Sheets

FIG. 5

| SRC IP | DST IP | QUEUE | PORT | DSCP | BANDWIDTH |
|---|---|---|---|---|---|
| 192.168.112.29 | 192.168.110.29 | VOICE TRAFFIC | 1433 | 46 | 2.6 KB |
| 192.168.112.30 | 192.168.110.30 | VOICE TRAFFIC | 1433 | 46 | 2.6 KB |
| 192.168.112.15 | 192.168.110.15 | UNKNOWN | 1433 | 46 | 4.2 KB |

SYSTEM AND METHOD FOR DETECTING ROGUE TRAFFIC USING FLOW STATISTICS WITH A LIST OF AUTHORIZED ENGINES

BACKGROUND

1. Technical Field

The present disclosure relates to detecting rogue network traffic and more specifically to analyzing network flow statistics to determine cause of unexpected packet loss or unexpected classification of packets as drop eligible.

2. Introduction

Due to the consistent growth of Internet and other network traffic, network administrators face a constant need to increase the bandwidth available while also managing network resources as optimally as possible. Increases in bandwidth have, to date, been largely accomplished with hardware upgrades, such as converting from analog modems to Ethernet cards and usage of fiber optic connections in place of pre-existing telephone connections. Efficient management of network resources often occurs in part through use of Differentiated Services, a networking architecture used to classify forms of network traffic. Network traffic utilizing Differentiated Services receives differentiated services code point markings identifying the traffic as belonging to pre-defined Class of Service queues, such as an audio queue and a video queue. Each queue can have a pre-defined bandwidth, with service rules establishing the priority of each queue and the consequences of exceeding the bandwidth. A flow collector collects statistics associated with traffic having differentiated services code point markings, at which point network administrators can monitor both overall network traffic as well as the traffic of the individual queues.

Despite this capability, the sheer amount of statistics means that looking for answers as to why signal distortion occurs can be like searching for a needle in a haystack. A common problem network administrators attempt to solve is the reason for audio packet loss. Service level agreements are often designed to give audio packets an absolute priority up to an agreed limit known as the audio CDR (Committed Data Rate). Should the audio queue bandwidth exceed the agreed upon CDR, the audio packets will simply be dropped without warning or recourse. Accordingly, it is important to monitor and plan traffic to ensure the packets placed in the audio queue will not exceed the CDR. Because network and traffic conditions evolve so rapidly, automated communication managers utilize a call admission control mechanism to analyze current and future traffic conditions, using that analysis to plan when specific packets of data will be communicated with the goal of not exceeding the CDR.

However, call admission control mechanisms only work to the extent that they are aware of packets appropriated to be in the audio queue. If a rogue application marks packets as belonging in the audio queue, but fails to send that information to be analyzed by the call admission control mechanism, the CDR can be exceeded and packets dropped. Similarly, an intermediate entity other than a source of traffic can be a rogue in that such an entity can misclassify packets into an incorrect queue. Video and other designated queues can suffer from similar vulnerabilities, but rather than dropping these packets they are often classified as out-of-contract by the service level provider and are drop eligible. To discover the cause of lost audio packets continues to require a difficult search through the data logs to discover the cause of the lost packets and/or packets which are drop eligible.

SUMMARY

Additional features and advantages of the disclosure will be set forth in the description which follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for detecting rogue traffic using flow statistics with a list of authorized engines. The method is discussed in terms of a system implementing the method. The system can be used to identify sources of rogue traffic. An administrator or an automated process can then use this data to prevent or correct sources of rogue traffic and even eliminate some sources rogue traffic when detected. Although the system disclosed herein is discussed in preventing and eliminating rogue audio traffic, the principles apply to any communication queue having a limited bandwidth, or CDR, such as video, data, or other traffic. When a service level provider classifies packets as out-of-contract and/or drop eligible, and indicates that by using a different marking for those packets, the system can analyze that data for clues to sources of the rogue traffic.

A system configured according to this disclosure receives data associated with a group of packets in a particular media queue. The particular media queue can include any queue, such as an audio queue, a video queue, a real-time queue, a best effort queue, or even a combination of multiple queues. Examples of data received can include the source network address where the packets originated, the destination network address for the packets, and an indication of an associated queue for the packets. The system then verifies the data received by comparing the source network address to a list of network addresses of known media engines. In one variation, a server maintains a list of known media engines, or devices, addresses, and/or software packages authorized or otherwise assumed to send and/or receive media packets in the media queue. Media engines can include voice over IP telephones, computers, smartphones, kiosks, mobile devices, and so forth, but can also include network infrastructure components, such as switches or routers that mark traffic or reassign traffic in a different queue. These media engines can be an application or other means for generating, outputting, or redirecting media content. The system can further verify that the indication of an associated queue for the packets is correct for the packets. Should the system detect failure in the verification of known media engines or the verification of indication of associated queues, the system generates a notification. This notification can then be stored in the system, or communicated to a supervisor or manager. The system can also use the notification to compile a larger report on the causes of audio loss or other network problems relating to rogue traffic or traffic that is otherwise mishandled or mislabeled with respect to queues. The system can incorporate, use, or rely upon virtually any known approach for detecting packet loss or classification of packets as drop eligible. The rogue traffic detection approaches set forth herein can work irrespective of how lost or drop eligible packets are detected.

The list of network addresses for known media engines can be a list of allowed network addresses and/or a list of prohibited network addresses. If the system is configured such that all traffic must originate at a network address found on the list of allowed network addresses and the system detects traffic from an unknown network address, the system can block traffic from that network address, or alternatively, can cause that traffic be routed to an alternate queue until reviewed by an administrator. If the system configuration provides that the list of network addresses is a list of prohibited network addresses and the system detects an address on the list, the system can similarly block the packets until an administrator reviews the occurrence.

When the system performs a test to verify that the indication of the associated queue is correct for the packets and discovers that the packets contain an incorrect indication, the system can, in addition to generating a notification, modify the indication to an allowed, or correct, indication. This allowed indication can be decided upon if the system has received previous instruction concerning incorrect indications, or if the system recognizes that a queue is established for incorrectly indicated packets. Alternatively, the system can block the packets associated with the incorrect indication. The system can forecast or predict a likely cause of the incorrectly handled packets, and include in the notification a proposed solution or a top N list of likely causes. With a sufficiently advanced set of rules, permissions, and automated functionality, the system can identify problems which it can resolve automatically. In those cases, the system can correct the problem and send a notification that the problem is either resolved or is going to be resolved.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 illustrates an example of packet data received.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for detecting rogue traffic using statistics with a list of authorized media engines. A system, method and non-transitory computer-readable media are disclosed which analyze data associated with a group of packets in a media queue and, if conditions are met, generate a notification. A brief introductory description of a basic general purpose system or computing device in FIG. 1 which can be employed to practice the concepts is disclosed herein. A more detailed description will then follow, accompanied by variations and examples. These variations shall be discussed herein as the various embodiments are set forth. The disclosure now turns to FIG. 1.

Figure 1:
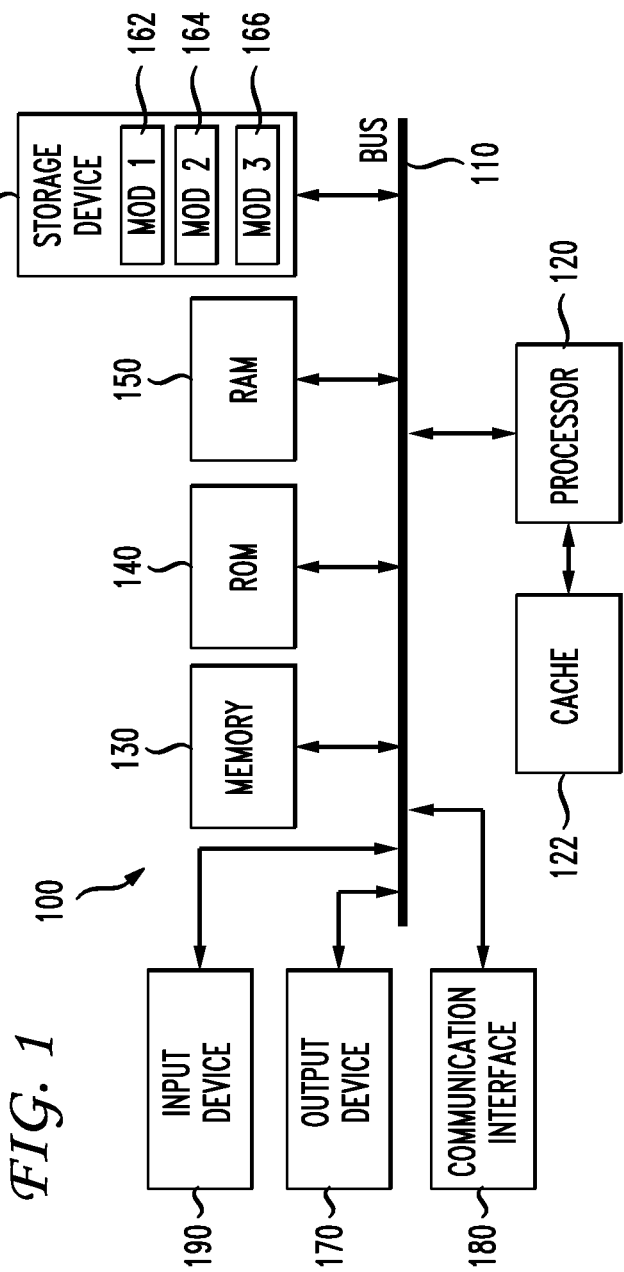
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod 1 162, Mod 2 164 and Mod 3 166 which are modules configured to control the processor 120. These modules may be stored on the storage device 160 and loaded into RAM 150 or memory 130 at runtime or may be stored as would be known in the art in other computer-readable memory locations.

Figure 2:
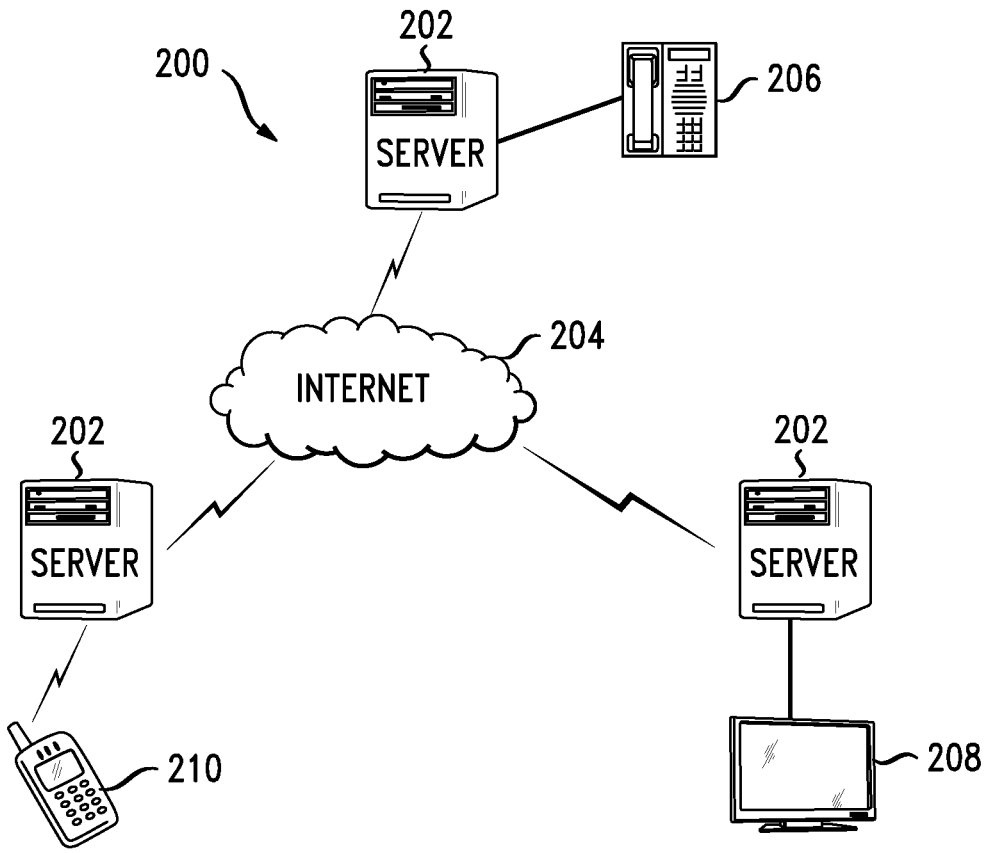
FIG. 2 illustrates an example network configuration.

Having disclosed some components of a computing system, the disclosure now turns to FIG. 2, which illustrates an exemplary network configuration 200 as considered within this disclosure. In the illustrated configuration 200 the network is the Internet 204. The principles set forth herein can be applied to local area networks, intranets, home networks, corporate networks, and virtually any other form of network. Several servers 202 connect to one another through the Internet 204, and each server 202 can further connect to a device 206, 208, 210 or can interface with a user directly. A server 202 can include any device that sends and/or receives traffic on the network 204. One example of a device is a phone 206 configured for Voice-Over-IP (VOIP), whereas another is a computer 208 or Internet enabled television. Another example is a cellular telephone 210 or radio which a server 202 converts into a digital signal and communicates over a network. Other exemplary devices which could be connected in the illustrated network 200 are tablet computers, hand held music or audio players having networking capabilities, and vehicles equipped with mobile network access. Each device connected to the network capable of producing media communications, whether those media communications be audio, video, text, or some other communication format, contain media engines which format and manipulate the raw data into the packets the system communicates. In many media engines the data requires modulation and manipulation to correctly format the data into the packets, while in other media engines the data needs only to be formatted and inserted into packet configurations.

Figure 3:
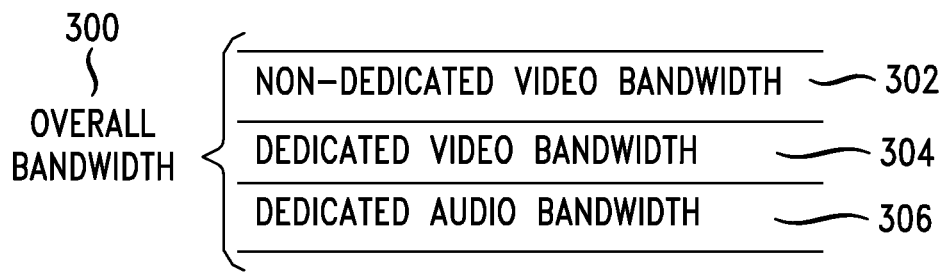
FIG. 3 illustrates bandwidth divided into segments.

FIG. 3 illustrates an exemplary bandwidth 300 divided into segments. The overall bandwidth 300 has specific segments, namely a non-dedicated video bandwidth 302, a dedicated video bandwidth 304, and a dedicated audio bandwidth 306. These segments, and in particular the dedicated video bandwidth 304 and the dedicated audio bandwidth 306 are defined by limits on the bandwidth defined by the contract with the service provider. These limits, also known as the Committed Data Rate (CDR), restrict the traffic which can be placed in each segment at a given time. These queues are exemplary and can include other types of traffic. Each different queue may have different rules for handling excess traffic. For example, the system can process in-contract packets in a data queue with no guarantee of throughput latency, and process out-of-contract packets in the data queue on a best-effort basis, while processing in-contract packets in an audio queue as the highest priority, and simply dropping out-of-contract packets in the audio queue.

The system, through a Communication Manager, places data packets into queues for each segment such that the traffic does not exceed the CDR. Should the traffic exceed the CDR, either due to a rogue application, hardware failure, misidentification of traffic type, or other cause, the system can shift or drop excess traffic depending on pre-defined rules. For example, if the traffic in the audio bandwidth 306 exceeds the CDR, the pre-defined rules can drop the excess packets or can shift the excess packets to another bandwidth segment. Similarly, if the traffic in the dedicated video bandwidth 304 exceeds the CDR, the system can drop or shift the excess packets. The illustrated example 300 show a non-dedicated video bandwidth segment 302 to which the system can redirect the excess video packets, whereas excess audio packets will be dropped. Because the system has established rules that excess audio packets will be dropped, this can result in poor quality audio if there is excess audio traffic.

Figure 4:
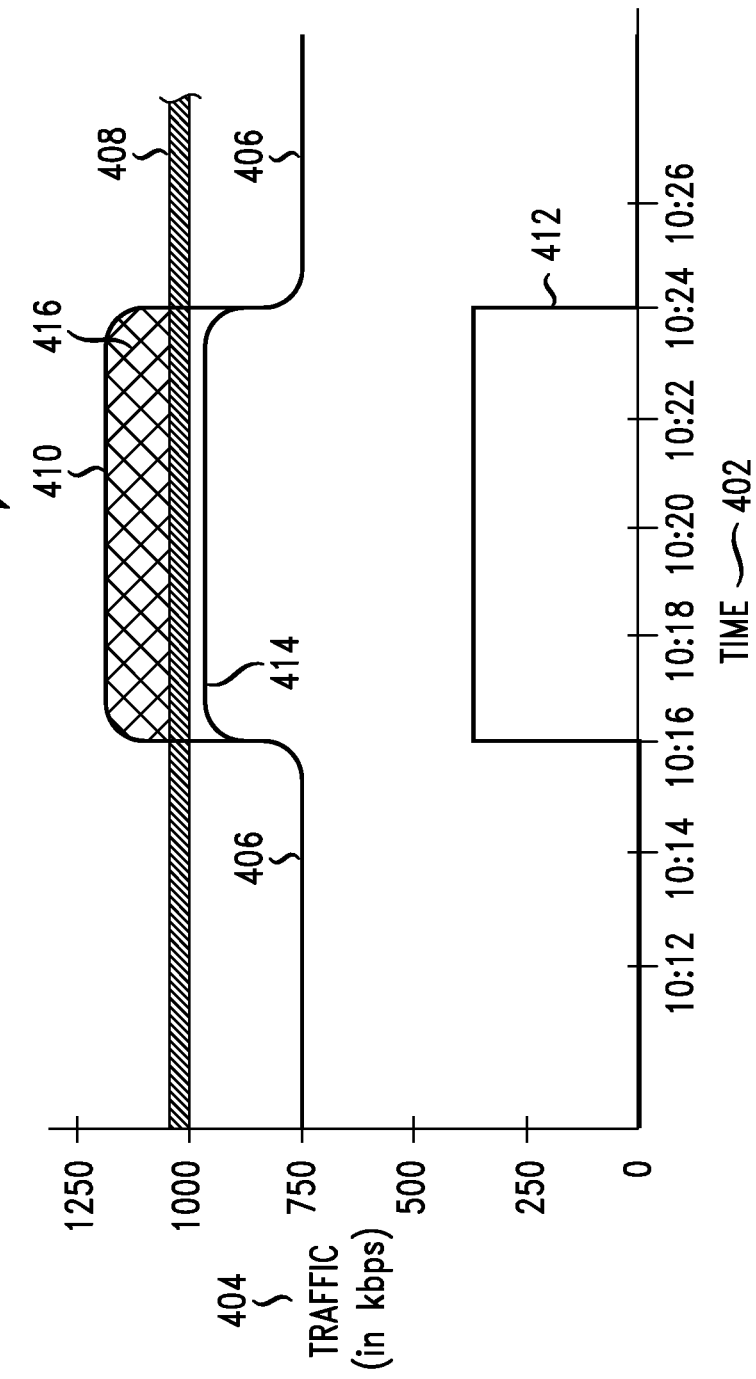
FIG. 4 illustrates an example audio channel exceeding its contractual limitation.

FIG. 4 illustrates an example audio channel 400 exceeding its contractual limitation. In this example time 402 and traffic 404 are shown in the 'x' and 'y' planes, respectively. A thicker line 408 represents the maximum bandwidth of the CDR, or bandwidth limit, of the audio segment 400 at approximately one Mbps. A line 406 having approximately seven hundred and fifty kbps represents the average traffic transmitted across the channel. This line 406 continues averaging seven hundred and fifty kbps until time 10:16, when new data packets 412 appear. These new data packets 412 increase the overall traffic up to near 1.25 Mbps, over the 1 Mbps limit. Line 410 represents the unabridged traffic fed into the segment, but the traffic as actually communicated appears as line 414 below the CDR 408. Between the CDR 408 and the unabridged traffic line 410 are packets 416 dropped by the system due to excess traffic. The actual packets dropped will depend on which packets arrive when, and what state the queue is in when the packets arrive, but FIG. 4 illustrates that packets are dropped. When the new data packets 412 end at time 10:22, the system no longer needs to drop packets and the average traffic 406 returns to approximately seven hundred and fifty kbps. In a carefully planned network, the average traffic 406 or maximum expected traffic should remain at or below the maximum allowed by the CDR 408. When an unexpected or unknown source injects rogue traffic 412 into such a carefully planned network, the result is often dropped packets. Further, such dedicated, high-performance queues can require significant cost, which often leads to network administrators purchasing only what is needed or only a small additional amount to mitigate costs. Thus, even a small amount of rogue traffic has the potential to cause significant problems.

FIG. 5 illustrates an example of received packet data 500. Exemplary fields within this data include source IP address 508, the destination IP address 510, the indication of the associated queue 512, a port, a detected differentiated services code point (DSCP) marking, and the bandwidth 514 or amount of data. Each row 502, 504, 506 represents unique packets from a source IP address 510 to a destination IP address 510. The system, upon receiving this data, can perform tests to verify the source IP addresses 508, destination IP addresses 510, the indication of the associated queue 512, and/or the bandwidth consumed 514. A system can perform these tests individually or in conjunction with one another. For example, one system can perform only a test verifying the destination IP address 510 of each set of data 502, 504, 506 to a list of network addresses of known destination IP addresses. Another system configuration can perform a test verifying the source IP address 508 of each set of data 502, 504, 506 to a list of network addresses of known media engines, followed by a test verifying that the indication of the associated queue 512 of each set of data 502, 504, 506.

As an example, consider a system configured to perform two tests, one verifying the source IP address 508 and a second test verifying the indication of the associated queue 512. The system could perform these tests in sequence, simultaneously, or in a reverse order depending upon circumstances and hardware requirements. As the system performs the first test and verifies the source IP address 508, the system compares each source IP address 508 for each set of data 502, 504, 506. If the source IP address 508 for the any row of data 502, 504, 506 does not appear in the list of known source IP addresses, the test fails, and the system generates a notification. While performing the second test, the system verifies the indication of the associated queue 512. In the illustrated example, the indication of associated queue 512 for the third row of data 506 reads "unknown." Accordingly, this row will fail the second test and the system will generate a notification.

Further configurations can provide verification using other tests, such as comparing the bandwidth 514 to look for outliers. For example, if most data sources use the same amount of bandwidth or are transmitting similar amounts of information, and a minority of data sources has a significantly different bandwidth or data usage, a system can generate a notification of the abnormality. Similar tests for abnormalities and outlier data can exist to test ports, DSCP markings, protocols, modulation formats, and encryption format, for example. Yet another test can consider the amount of time the data packets are in the audio queue. For example, if the data packets are found in the audio queue for a relatively short amount of time the system can plan accordingly, and no overall harm to the queue occurs. However, if the data is present for a substantial amount of time the queue could rapidly reach capacity. In such instances a test for the transmission times of data packets can help prevent packet loss.

Upon generating the notification the system can retain the notification in a list of notifications for review by an administrator. Alternatively, the system can email or otherwise communicate the notification to the administrator. Certain system configurations can apply a rating, or level of urgency to the notifications generated. For example, one system configuration provides that a low-priority notification has a level 1 priority, a high-priority notification has a level 5 priority, with level 1 being reviewed at the administrator's convenience and level 5 requiring immediate action. The system can then notify the administrator via an email or automated phone call upon discovering an error having a level 5 priority, but need not interrupt the administrator for priority 1 errors.

As another aspect, the system can use the notifications to develop a report of errors and failed tests discovered by the system. These reports, which can be for any useful time period, can illuminate otherwise unnoticed patterns. For example, if an unknown source IP address 508 appears every 45 days, it can be difficult to track and remember that occurrence, but the system configured can utilize the pattern of notifications generated to report the pattern. Additionally, the system can utilize the pattern of notifications to suggest alternative tests to the administrator. As an example, a system verifying destination IP addresses 510 and the indication of associated queue on each piece of data received can, based on the frequency and types of notifications generated, determine that the test of destination IP addresses 510 is inadequate. The system can then suggest to the administrator that the test for destination IP addresses 510 be supplemented or replaced with a test of source IP addresses 508.

The system can actively monitor traffic in real time, such as a software or hardware routine that runs on a network router or switch, or as a network appliance that can be attached to a network for diagnostic purposes. Alternatively, the system can monitor logs of previous network traffic. For example, an administrator receives a report of packet loss or a decrease in quality of voice over IP traffic. The administrator can retrieve and compile log files from that period of time, and feed those log files to the system. The system can analyze the log files to identify any potential sources of rogue traffic during those times, and generate a report. The administrator can then use that report to resolve the issue so that the packet loss due to that source of rogue traffic does not occur again.

Figure 6:
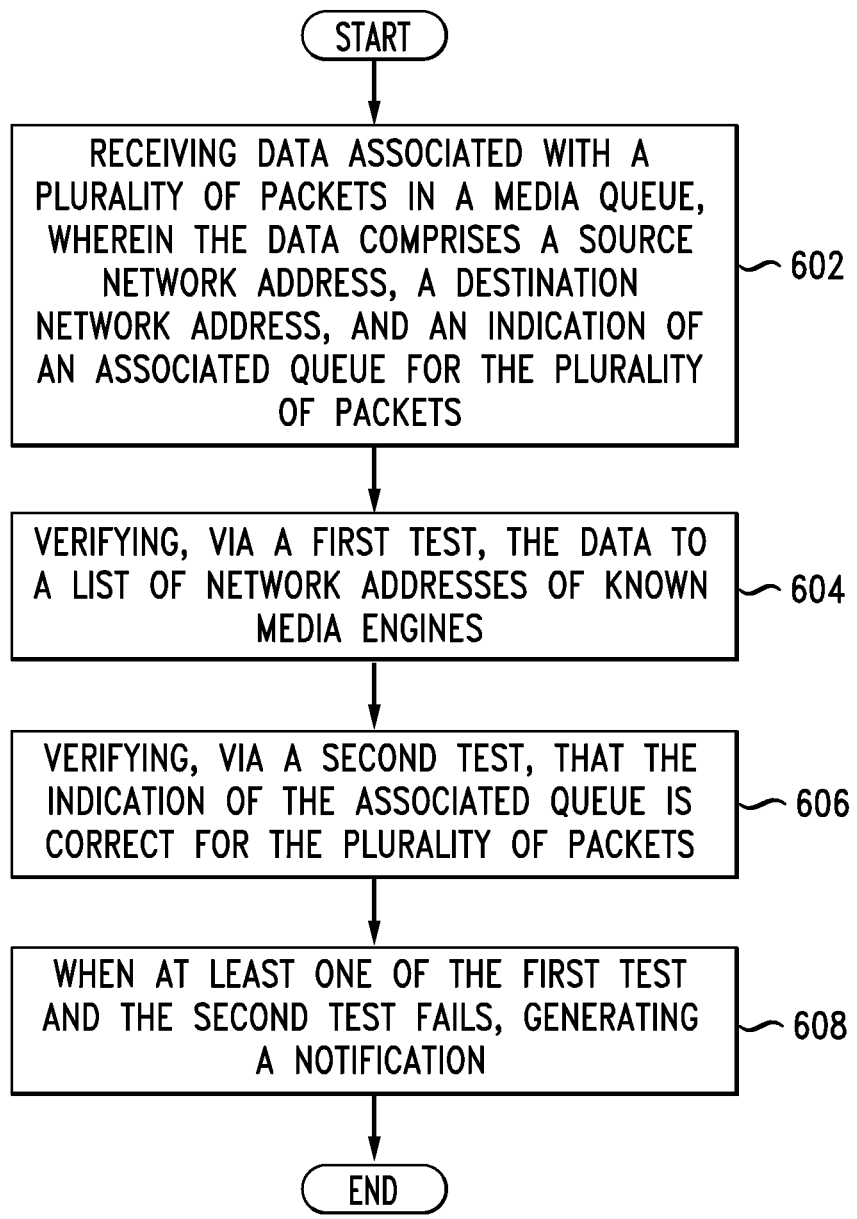
FIG. 6 illustrates an example method embodiment.

Having disclosed some basic system components and concepts, the disclosure now turns to the exemplary method embodiment shown in FIG. 6. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

The system 100 first receives data associated with a group of packets in a media queue, wherein the data includes a source network address, a destination network address, and an indication of an associated queue for the group of packets (602). Other categories within the data can include modulation type, protocol, bandwidth, size of the data, and the duration of transmission. The system 100 then verifies, via a first test, the data to a list of network addresses of known media engines (604), and verifies, via a second test, that the indication of the associated queue is correct for the group of packets (606). These tests can be performed sequentially, or can be performed simultaneously. The first and second test can be sub-components of a single test. When at least one of the first test and the second test fails, the system 100 generates a notification (608). The system 100 can then use the notification to create a report. The system 100 can also communicate the notification to an administrator or other personnel, in the form of an email, phone call, or text message. In this way, the notification signals that a potential source of rogue traffic was identified. The notification can include an indication of the source of the rogue traffic, an indication of how much bandwidth the rogue consumes, an indication of whether the rogue's behavior is predictable or periodic, whether the rogue traffic is due to an originating traffic source or due to some network component incorrectly labeling the traffic, and so forth. The administrator can arrange for any variety of indications within the notification.

Further, the administrator can set, as a general preference, a desired threshold of notifications. For example the administrator can instruct the system to send notifications of rogue traffic sources that use more than 100 kbps. The administrator can instruct the system to send notifications of all sources of rogue traffic upon receiving reports of dropped packets in a high value CDR. In a diagnostic mode, the system can send notifications of all detected sources of rogue traffic. The administrator can then sort and filter the sources by network segment, by consumed bandwidth, by ease of fixing the rogue node, and/or by any other attribute.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein not only to audio queues, but all media queues. Those skilled in the art will readily recognize various modifications and changes that may be made to the principles described herein without following the example embodiments and applications illustrated and described herein, and without departing from the spirit and scope of the disclosure.

I claim:

1. A method comprising:
receiving data associated with a plurality of packets in a media queue, wherein the data comprises a source network address, a destination network address, and an indication of an associated queue for the plurality of packets;
verifying, via a processor performing a first test, the data to a list of network addresses of known media engines;
verifying, via a second test, that the indication of the associated queue is correct for the plurality of packets; and
when at least one of the first test and the second test fails, generating a notification.

2. The method of claim 1, wherein the data further comprises at least one of a modulation type, a protocol, a bandwidth size, a data size, and a transmission duration.

3. The method of claim 1, wherein the first test and the second test are performed in sequence.

4. The method of claim 1, wherein the first test and the second test are performed simultaneously.

5. The method of claim 1, further comprising using the notification to generate a report.

6. The method of claim 1, further comprising communicating the notification to an administrator.

7. The method of claim 6, wherein the notification is communicated via an email.

8. A system comprising:
a processor; and
a non-transitory computer-readable storage medium having stored therein instructions which, when executed on the processor, perform a method comprising:
receiving data associated with a plurality of packets in a media queue, wherein the data comprises a source network address, a destination network address, and an indication of an associated queue for the plurality of packets;
verifying, via a first test, the data to a list of network addresses of known media engines;
verifying, via a second test, that the indication of the associated queue is correct for the plurality of packets; and
when at least one of the first test and the second test fails, generating a notification.

9. The system of claim 8, wherein the data further comprises at least one of a modulation type, a protocol, a bandwidth size, a data size, and a transmission duration.

10. The system of claim 8, wherein the first test and the second test are performed in sequence.

11. The system of claim 8, wherein the first test and the second test are performed simultaneously.

12. The system of claim 8, further comprising using the notification to generate a report.

13. The system of claim 8, further comprising communicating the notification to an administrator.

14. The system of claim 13, wherein the notification is communicated via an email.

15. A non-transitory computer-readable storage medium having stored therein instructions which, when executed by a computing device, cause the computing device to perform steps comprising:
   receiving data associated with a plurality of packets in a media queue, wherein the data comprises a source network address, a destination network address, and an indication of an associated queue for the plurality of packets;
   verifying, via a first test, the data to a list of network addresses of known media engines;
   verifying, via a second test, that the indication of the associated queue is correct for the plurality of packets; and
   when at least one of the first test and the second test fails, generating a notification.

16. The non-transitory computer-readable storage medium of claim 15, wherein the data further comprises at least one of a modulation type, a protocol, a bandwidth size, a data size, and a transmission duration.

17. The non-transitory computer-readable storage medium of claim 15, wherein the first test and the second test are performed in sequence.

18. The non-transitory computer-readable storage medium of claim 15, wherein the first test and the second test are performed simultaneously.

19. The non-transitory computer-readable storage medium of claim 15, further comprising using the notification to generate a report.

20. The non-transitory computer-readable storage medium of claim 15, further comprising communicating the notification to an administrator.

\* \* \* \* \*